(12) United States Patent
Kwrk

(10) Patent No.: US 8,310,598 B2
(45) Date of Patent: Nov. 13, 2012

(54) APPARATUS FOR SPLITTING SIGNAL AND VIDEO DEVICE USING THE SAME

(75) Inventor: Byung-ju Kwrk, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1525 days.

(21) Appl. No.: 11/751,704

(22) Filed: May 22, 2007

(65) Prior Publication Data

US 2008/0112505 A1    May 15, 2008

(30) Foreign Application Priority Data

Nov. 9, 2006    (KR) .................. 10-2006-0110700

(51) Int. Cl.
*H04N 5/54*    (2006.01)
(52) U.S. Cl. .......................................... 348/705; 725/72
(58) Field of Classification Search .................. 348/731, 348/725, 705, 706, 552, 553, 14.11; 725/72, 725/131, 127, 139, 151; 455/277.1, 179.1
See application file for complete search history.

(56) References Cited

U.S. PATENT DOCUMENTS

| | | | | | |
|---|---|---|---|---|---|
| 5,617,331 | A | * | 4/1997 | Wakai et al. | 725/76 |
| 5,678,217 | A | * | 10/1997 | Usui et al. | 455/277.1 |
| 6,813,477 | B1 | * | 11/2004 | Harris et al. | 455/67.14 |
| 2001/0037512 | A1 | * | 11/2001 | Flickner et al. | 725/131 |
| 2002/0154892 | A1 | * | 10/2002 | Hoshen et al. | 386/87 |
| 2003/0115588 | A1 | * | 6/2003 | Hoshino | 725/9 |
| 2004/0068754 | A1 | * | 4/2004 | Russ | 725/131 |
| 2005/0012823 | A1 | * | 1/2005 | Young | 348/211.2 |
| 2005/0240969 | A1 | * | 10/2005 | Sasaki et al. | 725/72 |

FOREIGN PATENT DOCUMENTS

| | | |
|---|---|---|
| KR | 1995-0034628 | 12/1995 |
| KR | 1996-0010381 Y1 | 12/1996 |
| KR | 10-2003-0054438 A | 7/2003 |
| KR | 10-2005-0011072 A | 1/2005 |

OTHER PUBLICATIONS

Communication dated May 11, 2010 issued by the State Intellectual Property Office of P.R. China in a counterpart Chinese application No. 200710112670.2.

* cited by examiner

*Primary Examiner* — Paulos Natnael
(74) *Attorney, Agent, or Firm* — Sughrue Mion, PLLC

(57) ABSTRACT

An apparatus for splitting a signal and a video device using the same are disclosed. The apparatus includes a first splitting unit to split an inputted broadcast signal into a first broadcast signal and a second broadcast signal, and to supply the first broadcast signal to a first broadcast signal processing element, and a second splitting unit to split the second broadcast signal into a third broadcast signal and a fourth broadcast signal, and to supply the third broadcast signal to a second broadcast signal processing element. With this construction, the apparatus can distribute and provide a broadcast signal with a noise figure (NF) lower than that of other broadcast signals, to an element, which requires a broadcast signal with a low noise figure. In addition, the apparatus can split the inputted broadcast signal without using an active element, such as an amplifier or the like, thereby allowing the split broadcast signals to lower the NF thereof and to uniformly maintain a gain thereof. Also, the apparatus can prevent interferences, which are generated between adjacent ports.

21 Claims, 3 Drawing Sheets

APPARATUS FOR SPLITTING SIGNAL AND VIDEO DEVICE USING THE SAME

CROSS-REFERENCE TO RELATED APPLICATIONS

This application claims the benefit under 35 U.S.C. §119(a) of Korean Patent Application No. 10-2006-0110700, filed Nov. 9, 2006, in the Korean Intellectual Property Office, the entire disclosure of which is incorporated herein by reference.

FIELD OF THE INVENTION

The present invention relates generally to an apparatus for splitting a signal and a video device using the same. More particularly, the present invention relates to an apparatus for splitting a signal, which splits a single broadcast signal into a plurality of broadcast signals, and a video device using the same.

BACKGROUND OF THE INVENTION

To split a broadcast signal, various methods are known, but a method, which splits a single broadcast signal into two broadcast signals and then re-splits each of the split two broadcast signals into two broadcast signals to form four broadcast signals, is usually used.

Since the four broadcast signals formed as described above are formed after passing splitting processes of total two times, a problem occurs, in that they have noise figure (NF) increased.

Further, to amplify the broadcast signals diminished while passing the splitting processes, a conventional signal splitting apparatus usually uses amplifiers. However, since such amplifiers belong to the active element, with use of the amplifiers, a problem occurs, in that, the NF of the broadcast signals is increased all the more.

In addition, the amplifiers require bias in operation. However, if the bias is changed, the broad signals are influenced by the changed bias, so that a gain thereof is changed. Accordingly, a problem occurs, in that broadcast signal processing elements, which require a certain gain of broadcast signals, generate errors in signal processing.

Also, if a port from which one split broadcast signal is outputted is located adjacent to a port from which another split broadcast signal is outputted, a leakage generated from one split broadcast signal has an effect on another split broadcast signal, thereby deteriorating the performance of the signal splitting apparatus.

SUMMARY OF THE INVENTION

An aspect of the present invention is to solve at least the above problems and/or disadvantages and to provide at least the advantages described below. Accordingly, an aspect of the present invention is to provide an apparatus for splitting a signal capable of distributing and providing a broadcast signal with a noise figure (NF) lower than that of other broadcast signals, to an element, which requires a broadcast signal with a low NF, and a video device using the same.

Another object of the present invention is to an apparatus for splitting a signal, which splits an inputted broadcast signal without using an active element, such as an amplifier or the like, thereby allowing split broadcast signals to lower a NF thereof and to uniformly maintain a gain thereof, and a video device using the same.

Still another object of the present invention is to an apparatus for splitting a signal capable of preventing interferences, which are generated between adjacent ports, and a video device using the same.

According to an aspect of an exemplary embodiment of the present invention, there is provided an apparatus for splitting a signal, including a first splitting unit to split an inputted broadcast signal into a first broadcast signal and a second broadcast signal, and to supply the first broadcast signal to a first broadcast signal processing element, and a second splitting unit to split the second broadcast signal into a third broadcast signal and a fourth broadcast signal, and to supply the third broadcast signal to a second broadcast signal processing element.

The second splitting unit may supply the fourth broadcast signal to a third broadcast signal processing element.

Preferably, but not necessarily, the first broadcast signal processing element includes a broadcast signal processing element to require a broadcast signal having a noise figure lower than that of the second and the third broadcast signal processing elements.

Preferably, but not necessarily, the apparatus further includes a third splitting unit to split the fourth broadcast signal into a fifth broadcast signal and a sixth broadcast signal, and to supply the fifth broadcast signal to a third broadcast signal processing element and supply the sixth broadcast signal to a fourth broadcast signal processing element.

Also, preferably, but not necessarily, the apparatus further includes an isolating element disposed between the second splitting unit and the third splitting unit to isolate between input ends of the first and the second broadcast signal processing elements and input ends of the third and the fourth broadcast signal processing elements.

The isolating element may block a leakage of at least one of the first and the second broadcast signal processing elements from exerting influence on at least one of the third and the fourth broadcast signal processing elements.

Also, preferably, but not necessarily, the isolating element includes a transformer in which a winding ratio of an input side to an output side is 1:n. Preferably, but not necessarily, the third splitting unit includes a transformer to split the fourth broadcast signal in a splitting ratio of n:1. Here, the n may be a real number larger than 1.

Preferably, but not necessarily, the fourth broadcast signal processing element includes a broadcast signal processing element to require a broadcast signal having a noise figure and a change in gain, which are lower than those of the third broadcast signal processing element.

Also, the first broadcast signal processing element may be an element to select a broadcast channel to be displayed on a main screen, the second broadcast signal processing element may be an element to select a broadcast channel to be displayed on a sub-screen, the third broadcast signal processing element may be an element to extract additional information included in the broadcast signal, and the fourth broadcast signal processing element may be an element to provide a data communication using a modem.

Preferably, but not necessarily, the isolating element has input impedance higher than an impedance connected to an output end thereof.

Also, preferably, but not necessarily, the inputted broadcast signal includes a cable broadcast signal received through a cable, satellite broadcast signal, IPTV broadcast signal or other types of broadcast signals.

According to another aspect of an exemplary embodiment of the present invention, there is provided a video device, including a broadcast receiving unit to receive a broadcast signal, a signal splitting apparatus to split the broadcast signal received by the broadcast receiving unit into a plurality of broadcast signals, and a broadcast processing module to process the broadcast signals split by the signal splitting apparatus. The signal splitting apparatus includes a first splitting unit to split the broadcast signal received by the broadcast receiving unit into a first broadcast signal and a second broadcast signal, and to supply the first broadcast signal to a first broadcast signal processing element disposed in the broadcast processing module, and a second splitting unit to split the second broadcast signal into a third broadcast signal and a fourth broadcast signal, and to supply the third broadcast signal to a second broadcast signal processing element disposed in the broadcast processing module.

The device may further include a broadcast displaying module to display the broadcast signals processed by the broadcast processing module.

Preferably, but not necessarily, the signal splitting apparatus further includes a third splitting unit to split the fourth broadcast signal into a fifth broadcast signal and a sixth broadcast signal, and to supply the fifth broadcast signal to a third broadcast signal processing element disposed in the broadcast processing module and supply the sixth broadcast signal to a fourth broadcast signal processing element disposed in the broadcast processing module.

Also, preferably, but not necessarily, the signal splitting apparatus further includes an isolating element disposed between the second splitting unit and the third splitting unit to isolate between input ends of the first and the second broadcast signal processing elements and input ends of the third and the fourth broadcast signal processing elements.

BRIEF DESCRIPTION OF THE DRAWING FIGURES

The above aspect and other features of the present invention will become more apparent by describing in detail exemplary embodiments thereof with reference to the attached drawing figures, wherein.

Throughout the drawings, the same drawing reference numerals will be understood to refer to the same elements, features, and structures.

DETAILED DESCRIPTION OF THE EXEMPLARY EMBODIMENTS

Hereinafter, an apparatus for splitting a signal in accordance with exemplary embodiments of the present invention and a video device using the same will be described in detail with reference to the accompanying drawing figures.

Figure 1:
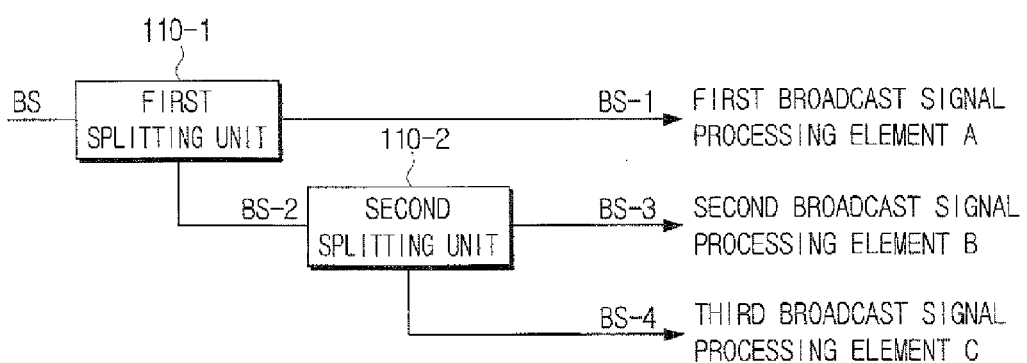
FIG. 1 is a block diagram exemplifying an apparatus for splitting a signal in accordance with a first exemplary embodiment of the present invention.

FIG. 1 is a block diagram exemplifying an apparatus for splitting a signal in accordance with a first exemplary embodiment of the present invention. As illustrated in FIG. 1, the signal splitting apparatus in accordance with the first exemplary embodiment of the present invention is provided with a first splitting unit 110-1 and a second splitting unit 110-2.

The first splitting unit 110-1 splits an inputted broadcast signal (referred as BS below) into a first broadcast signal (referred as BS-1 below) and a second broadcast signal (referred as BS-2 below). The BS inputted to the first splitting unit 110-1 may be a cable broadcast signal, which is received through a cable. The split BS-1 is split no longer, but supplied to a first broadcast processing element A.

To the contrary, the split BS-2 is re-split. To be more specific, the second splitting unit 110-2 re-splits the BS-2 split by the first splitting unit 110-1 into a third broadcast signal (referred as BS-3 below) and a fourth broadcast signal (referred as BS-4 below). The re-split BS-3 is supplied to a second broadcast signal processing element B, and the re-split BS-4 is supplied to a third broadcast processing element C.

Among the BS-1, the BS-3 and the BS-4 split by and outputted from the signal splitting apparatus in accordance with the first exemplary embodiment of the present invention, the BS-1 has a noise figure (NF) lower than that of the BS-3 or the BS-4. The reason is that the BS-1 is a broadcast signal, which has less split number of times than that of the BS-3 or the BS-4.

Accordingly, when the first broadcast processing element A is embodied in a broadcast processing element, which requires a broadcast signal with a NF lower than that of the second broadcast signal processing element B or the third broadcast signal processing element C (that is, when a broadcast processing element, which requires a broadcast signal with a low NF, is embodied to receive the BS-1), more superior performance can be obtained.

Figure 2:
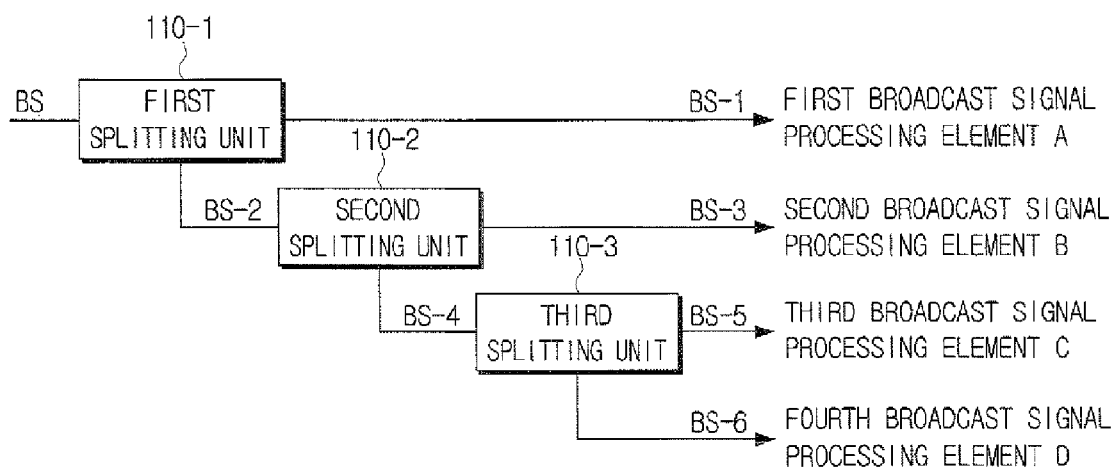
FIG. 2 is a block diagram exemplifying an apparatus for splitting a signal in accordance with a second exemplary embodiment of the present invention.

FIG. 2 is a block diagram exemplifying an apparatus for splitting a signal in accordance with a second exemplary embodiment of the present invention. The signal splitting apparatus illustrated in FIG. 2 further includes a splitting unit as compared with the signal splitting apparatus illustrated in FIG. 1. Namely, the signal splitting apparatus illustrated in FIG. 2 further includes a third splitting unit 110-3 in addition to a first splitting unit 110-1 and a second splitting unit 110-2.

The first splitting unit 110-1 is equal to the first splitting unit 110-1 illustrated in FIG. 1, in that it splits an inputted BS into a BS-1 and a BS-2 and supplies the split BS-1 to a first broadcast signal processing element A.

The second splitting unit 110-2 is similar to the second splitting unit 110-2 illustrated in FIG. 1, in that it re-splits the BS-2 split by the first splitting unit 110-1 into a BS-3 and a BS-4 and supplies the re-split BS-3 to a second broadcast signal processing element B.

However, the second splitting unit 110-2 illustrated in FIG. 2 is different from the second splitting unit 110-2 illustrated in FIG. 1, in that it does not supply the re-split BS-4 to a third broadcast processing element C, but to the third splitting unit 110-3.

The third splitting unit 110-3 re-splits the BS-4 re-split by the second splitting unit 110-2 into a fifth broadcast signal (referred as BS-5 below) and a sixth broadcast signal (referred as BS-6 below). And the third splitting unit 110-3 supplies the re-split BS-5 to the third broadcast signal processing element C, and supplies the re-split BS-6 to a fourth broadcast processing element D.

Among the BS-1, the BS-3, the BS-5 and the BS-6 split by and outputted from the signal splitting apparatus in accordance with the second exemplary embodiment of the present invention, the BS-1 has a NF lower than that of the BS-3, the BS-5 or the BS-6. The reason is that the BS-1 is a broadcast signal, which has less split number of times than that of the BS-3, the BS-5 or the BS-6.

Also, the BS-3 has a NF lower than that of the BS-5 or the BS-6. The reason is that the BS-3 is a broadcast signal, which has less split number of times than that of the BS-5 or the BS-6.

Accordingly, when the first broadcast processing element A is embodied in a broadcast processing element, which requires a broadcast signal with the lowest NF and the second broadcast processing element B is embodied in a broadcast processing element, which requires a broadcast signal with the next-lowest NF, more superior performance can be obtained.

Figure 3:
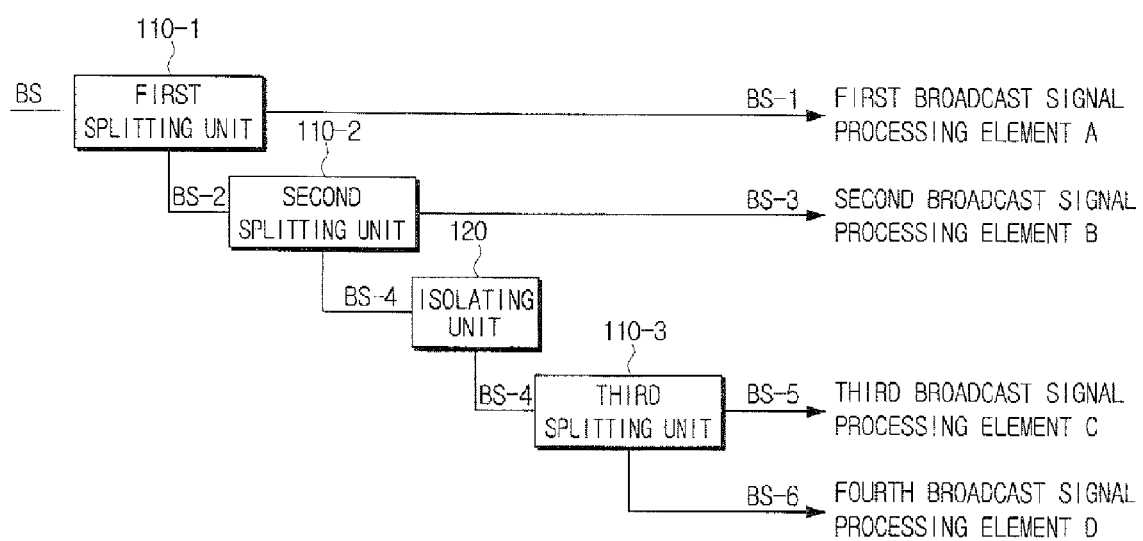
FIG. 3 is a block diagram exemplifying an apparatus for splitting a signal in accordance with a third exemplary embodiment of the present invention.

FIG. 3 is a block diagram exemplifying an apparatus for splitting a signal in accordance with a third exemplary embodiment of the present invention. The signal splitting apparatus illustrated in FIG. 3 further includes an isolating element as compared with the signal splitting apparatus illustrated in FIG. 2. Namely, the signal splitting apparatus illustrated in FIG. 3 further includes an isolating unit 120 in addition to a first splitting unit 110-1, a second splitting unit 110-2, and a third splitting unit 110-3.

The isolating unit 120 is disposed between the second splitting unit 110-2 and the third splitting unit 110-3. The isolating unit 120 is an element for isolating between input ends of first and second broadcast signal processing elements A and B and input ends of third and fourth broadcast signal processing elements C and D.

With the isolating unit 120, the influence of a leakage from the first and/or the second broadcast signal processing elements A and/or B on the third and/or the fourth broadcast signal processing elements C and/or D can be blocked.

Figure 4:
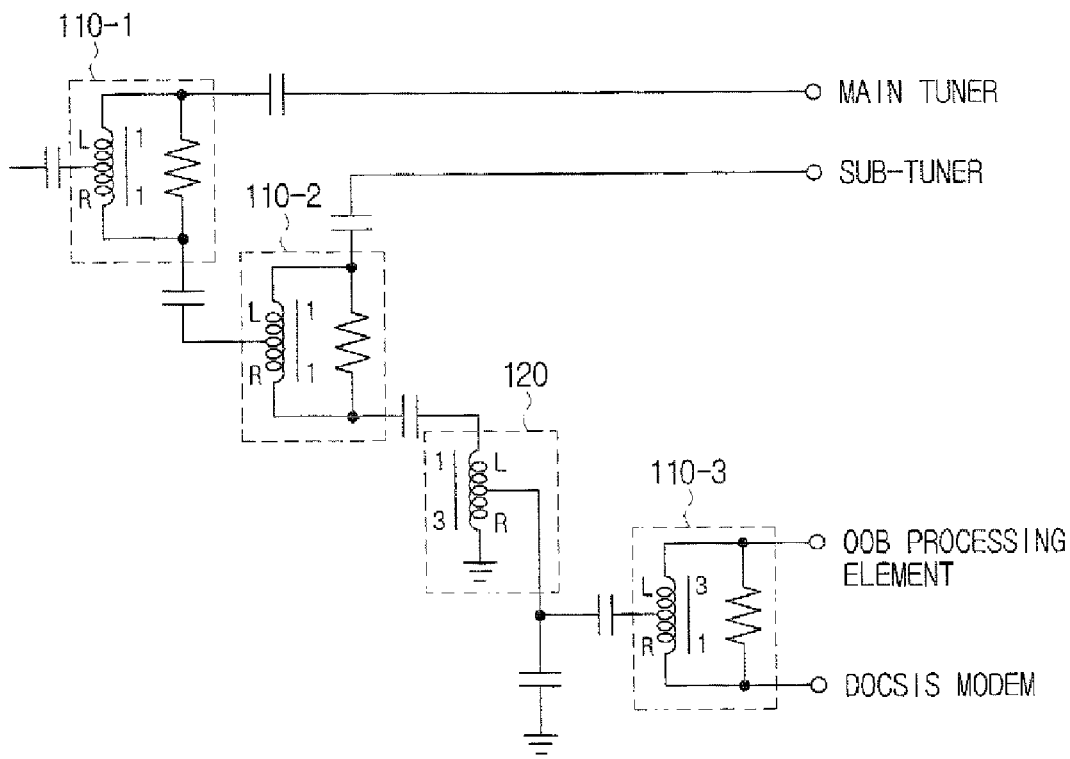
FIG. 4 is a circuit diagram of the signal splitting apparatus illustrated in FIG. 3.

FIG. 4 is a circuit diagram of the signal splitting apparatus illustrated in FIG. 3. Referring to FIG. 4, it can be appreciated that each of the first and the second splitting units 110-1 and 110-2 was embodied by using a transformer splitting an inputted signal in a splitting ratio of 1:1 and a resistance for impedance matching.

And the first broadcast signal processing element A was embodied in a main tuner, which selects a broadcast channel to be displayed on a main screen, and the second broadcast signal processing element B was embodied in a sub-tuner, which selects a broadcast channel to be displayed on a sub-screen. This is because a broadcast signal with the lowest NF is preferably supplied to the main tuner and a broadcast signal with the next-lowest NF is preferably supplied to the sub-tuner.

Also, the third broadcast signal processing element C was embodied in an out-of-band (OOB) processing element for carrying out an OOB function, and the fourth broadcast signal processing element D was embodied in a data-over-cable service interface specification (DOCSIS) modem for carrying out a DOCSIS function. Here, the OOB function is a kind of function, which extracts additional information included in the broadcast signal to provide visual information to a user such as EPG information, and the DOCSIS function is a kind of function, which provides a data communication between a broadcasting provider and the user by using a cable modem.

None of the OOB function and the DOCSIS function concerns a function, which provides an image on a screen. Accordingly, the OOB processing element and the DOCSIS modem, which use the additional information and the data having an amount smaller than that of the image, respectively, were embodied, so that broadcast signals having a NF higher than that of the broadcast signals supplied to the main tuner and the sub-tuner are supplied thereto, respectively.

In addition, the isolating unit 120 was embodied in a transformer in which a winding ratio of an input side to an output side is 1:3. Since an input impedance of the transformer in which the winding ratio is 1:3 is 32 times of impedance at an output end thereof, the transformer in which the winding ratio is 1:3 belongs to the impedance converting element, which causes the input impedance to increase.

According to this, input ends of the main tuner and the sub-tuner and input ends of the OOB processing element and the DOCSIS modem are isolated from each other due to the increased input impedance of the isolating unit 120. Accordingly, the influence of a leakage from the main tuner and/or the sub-tuner on the OOB processing element and/or the DOCSIS modem can be blocked.

The third splitting unit 110-3 was embodied by using a transformer splitting an inputted signal in a splitting ratio of 3:1 and a resistance for impedance matching. The splitting ratio of the third splitting unit 110-3 is different from that of the first and the second splitting units 110-1 or 110-2, in that it is set as 3:1. Since the DOCSIS modem is an element relatively sensitive to a NF and a change in gain of the broadcast signal, to allow the broadcast signal supplied thereto to lower the NF and to uniformly maintain the gain, the splitting ratio of the third splitting unit 110-3 was set to be different from that of the first and the second splitting units 110-1 or 110-2. Detailed description on that is as follows.

With the third splitting unit 110-3 embodied in the transformer in which the splitting ratio is 3:1, input impedance to the DOCSIS modem at an input end of the third splitting unit 110-3 comes to be smaller than input impedance to the OOB processing element at the input end of the third splitting unit 110-3.

Namely, the input impedance to the DOCSIS modem at the input end of the third splitting unit 110-3 is relatively small. Accordingly, due to the third splitting unit 110-3, the influence of the input impedance of the isolating unit 120 increased by the isolating unit 120 as described above on the DOCSIS modem is compensated.

In other words, it cannot be see that the input impedance to the DOCSIS modem at the input end of the isolating unit 120 is greatly increased. This is because the third splitting unit 110-3 acts to convert the impedance.

After all, impedance characteristic from the input end of the isolating unit 120 to the input end of the DOCSIS modem is uniformly maintained, so that the NF of the broadcast signal supplied to the DOCSIS modem is lowered and the gain of the broadcast signal supplied to the DOCSIS modem is also uniformly maintained. Of course, the broadcast signal supplied to the DOCSIS modem has lower NF and more uniform gain than those of the broadcast signal supplied to the OOB processing element.

Capacitors disposed between the splitting units 110-1, 110-2 and 110-3 and the isolating unit 120 illustrated in FIG. 4 are elements, which are used for DC blocking.

On the other hand, although the first and the second splitting units 110-1 and 110-2 illustrated in FIG. 4 are explained as embodied in the transformers in which the splitting ratio is 1:1, it goes without saying that they can be embodied in transformers with different splitting ratio.

Also, although the isolating unit 120 is explained as embodied in the transformer in which the winding ratio of the input end to the output end is 1:3, it goes without saying that it can be embodied in a transformer with different winding ratio. Namely, the isolating unit 120 can be embodied in a transformer in which the winding ratio of the input end to the output end is 1:n. Here, preferably, but not necessarily, the n is a real number larger than 1. This is because if so, the isolating unit 120 can be embodied to have an increase input impedance.

If the isolating unit 120 is embodied in the transformer in which the winding ratio of the input end to the output end is 1:n, preferably, but necessarily, the third splitting unit 110-3 is embodied in a transformer in which the splitting ratio is n:1. The reason is that if so, the influence of the input impedance of the isolating unit 120 increased by the isolating unit 120 on the DOCSIS modem is compensated by the third splitting unit 110-3, so that the NF of the broadcast signal supplied to the DOCSIS modem can be lowered.

Although the signal splitting apparatus illustrated in FIGS. 3 and 4 is explained and illustrated as having a single isolating unit 120, it can be embodied to have more than two isolating units. For instance, the signal splitting apparatus can be embodied, so that another isolating unit is disposed between the first splitting unit 110-1 and the second splitting unit 110-2, thereby isolating the input end of the main tuner and the input end of the sub-tuner from each other.

Also, although the signal splitting apparatus illustrated in FIGS. 2 and 3 is explained and illustrated as embodied by using three splitting units, it can be embodied to have more than four splitting units in the same technical sprit and principle.

Figure 5:
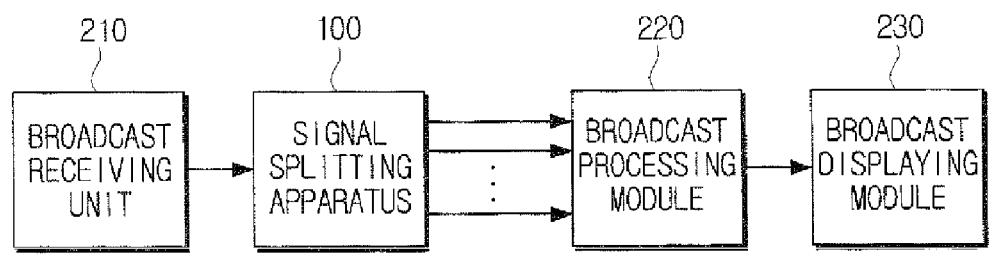
FIG. 5 is a block diagram exemplifying a video device, which is realized by employing the signal splitting apparatus in accordance with the exemplary embodiments of the present invention.

Hereinafter, a video device to which the signal splitting apparatus constructed as explained above is applied will now be described in detail. FIG. 5 is a block diagram exemplifying the video device, which is realized by employing the signal splitting apparatus.

As illustrated in FIG. 5, the video device is provided with a broadcast receiving unit 210, a signal splitting apparatus 100, a broadcast processing module 220, and a broadcast displaying module 230.

The broadcast receiving unit 210 receives a broadcast signal and transmits the received broadcast signal to the signal splitting apparatus 100. Here, the broadcast receiving unit 210 can receive a cable broadcast signal through a cable.

The signal splitting apparatus 100 splits the broadcast signal transmitted from the broadcast receiving unit 210 into a plurality of broadcast signals. The signal splitting apparatus 100 may be any one of the signal splitting apparatuses illustrated in FIGS. 1 through 4.

The broadcast processing module 220 is a module, which processes the broadcast signals split by the signal splitting apparatus 100 to provide a broadcast signal processing function, a OOB function, a DOCSIS function, etc. The main tuner, the sub-tuner, the OOB processing element, the DOCSIS modem and the like as explained with reference to FIGS. 1 through 4 are included in the broadcast processing module 220. The broadcast displaying module 230 is a display element on which broadcast information, visual information and the like processed by the broadcast processing module 220 are displayed.

When the video device is embodied, the present invention will not limit to include all of the blocks illustrated FIG. 5 in the video device, and unnecessary blocks can be omitted from the video device. For instance, a TV should include all of the blocks illustrated FIG. 5, but a set top box (STB) can omit the broadcast displaying module 230.

As apparent from the foregoing description, according to the exemplary embodiments of the present invention, the signal splitting apparatus and the video device using the same can distribute and provide the broadcast signal with the NF lower than that of other broadcast signals, to the element, which requires the broadcast signal with the low NF.

Further, the signal splitting apparatus according to the exemplary embodiments of the present invention and the video device using the same can split the inputted broadcast signal without using an active element, such as an amplifier or the like, thereby allowing the split broadcast signals to lower the NF thereof and to uniformly maintain the gain thereof.

Also, the signal splitting apparatus according to the exemplary embodiments of the present invention and the video device using the same can prevent interferences, which are generated between adjacent ports, thereby providing more good broadcasting service to the user.

Although representative exemplary embodiments of the present invention have been shown and described in order to exemplify the principle of the present invention, the present invention is not limited to the specific exemplary embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. An apparatus for splitting a signal, comprising:
a first splitting unit to split an inputted broadcast signal into a first broadcast signal and a second broadcast signal, and to supply the first broadcast signal to a first broadcast signal processing element;
a second splitting unit to split the second broadcast signal into a third broadcast signal and a fourth broadcast signal, and to supply the third broadcast signal to a second broadcast signal processing element; and
a third splitting unit to split the fourth broadcast signal into a fifth broadcast signal and a sixth broadcast signal, and to supply the fifth broadcast signal to a third broadcast signal processing element and supply the sixth broadcast signal to a fourth broadcast signal processing element,
an isolating element disposed between the second splitting unit and the third splitting unit to isolate between input ends of the first and the second broadcast signal processing elements and input ends of the third and the fourth broadcast signal processing elements,
wherein the second splitting unit supplies the fourth broadcast signal to the third broadcast signal processing element and
wherein the first broadcast signal processing element comprises a broadcast signal processing element to require a broadcast signal having a noise figure lower than that of the second and the third broadcast signal processing elements.

2. The apparatus of claim 1, wherein the isolating element comprises a transformer in which a winding ratio of an input side to an output side is 1:n.

3. The apparatus of claim 2, wherein the third splitting unit comprises a transformer to split the fourth broadcast signal in a splitting ratio of n:1.

4. The apparatus of claim 3, wherein the n comprises a real number larger than 1.

5. The apparatus of claim 3, wherein the fourth broadcast signal processing element comprises a broadcast signal processing element to require a broadcast signal having a noise figure and a change in gain, which are lower than those of the third broadcast signal processing element.

6. The apparatus of claim 3, wherein the first broadcast signal processing element comprises an element to select a broadcast channel to be displayed on a main screen, the second broadcast signal processing element comprises an element to select a broadcast channel to be displayed on a sub-screen, the third broadcast signal processing element comprises an element to extract additional information included in the broadcast signal, and the fourth broadcast signal processing element comprises an element to provide a data communication using a modem.

7. The apparatus of claim 1, wherein the isolating element has an input impedance higher than an impedance connected to an output end thereof.

8. The apparatus of claim 1, wherein the inputted broadcast signal comprises a cable broadcast signal received through a cable.

9. The apparatus of claim 1, wherein the first broadcast signal processing element is a main tuner to extract the audio and/or video portion of the inputted broadcast signal for a main display.

10. The apparatus of claim 9, wherein the second broadcast processing element is a tuner to extract the audio and/or video portion of the inputted broadcast signal for a sub-screen display.

11. The apparatus of claim 10, wherein the sub-screen display is a PIP display.

12. The apparatus of claim 10, wherein the third broadcast processing element is a tuner to extract the data information from the inputted broadcast signal for information display.

13. An apparatus for splitting a signal, comprising:
a first splitting unit to split an inputted broadcast signal into a first broadcast signal and a second broadcast signal, and to supply the first broadcast signal to a first broadcast signal processing element;
a second splitting unit to split the second broadcast signal into a third broadcast signal and a fourth broadcast signal, and to supply the third broadcast signal to a second broadcast signal processing element;
a third splitting unit to split the fourth broadcast signal into a fifth broadcast signal and a sixth broadcast signal, and to supply the fifth broadcast signal to a third broadcast signal processing element and supply the sixth broadcast signal to a fourth broadcast signal processing element, and
an isolating element disposed between the second splitting unit and the third splitting unit to isolate between input ends of the first and the second broadcast signal processing elements and input ends of the third and the fourth broadcast signal processing elements,
wherein the isolating element blocks a leakage of at least one of the first and the second broadcast signal processing elements from exerting influence on at least one of the third and the fourth broadcast signal processing elements.

14. A video device, comprising:
a broadcast receiving unit to receive a broadcast signal;
a signal splitting apparatus to split the broadcast signal received by the broadcast receiving unit into a plurality of broadcast signals; and a broadcast processing module to process the broadcast signals split by the signal splitting apparatus;
wherein the signal splitting apparatus comprises: a first splitting unit to split the broadcast signal received by the broadcast receiving unit into a first broadcast signal and a second broadcast signal, and to supply the first broadcast signal to a first broadcast signal processing element disposed in the broadcast processing module without further splitting the first broadcast signal;
a second splitting unit to split the second broadcast signal into a third broadcast signal and a fourth broadcast signal, and to supply the third broadcast signal to a second broadcast signal processing element disposed in the broadcast processing module; and
a third splitting unit to split the fourth broadcast signal into a fifth broadcast signal and a sixth broadcast signal, and to supply the fifth broadcast signal to a third broadcast signal processing element disposed in the broadcast processing module and supply the sixth broadcast signal to a fourth broadcast signal processing element disposed in the broadcast processing module,
an isolating element disposed between the second splitting unit and the third splitting unit to isolate between input ends of the first and the second broadcast signal processing elements and input ends of the third and the fourth broadcast signal processing elements,
wherein the second splitting unit supplies the fourth broadcast signal to the third broadcast signal processing element and
wherein the first broadcast signal processing element comprises a broadcast signal processing element to require a broadcast signal having a noise figure lower than that of the second and the third broadcast signal processing elements.

15. The device of claim 14, further comprising:
a broadcast displaying module to display the broadcast signals processed by the broadcast processing module.

16. The apparatus of claim 14, wherein the first broadcast signal processing element is a main tuner to extract the audio and/or video portion of the inputted broadcast signal for a main display.

17. The apparatus of claim 16, wherein the second broadcast processing element is a tuner to extract the audio and/or video portion of the inputted broadcast signal for a sub-screen display.

18. The apparatus of claim 17, wherein the sub-screen display is a PIP display.

19. The apparatus of claim 17, wherein the third broadcast processing element is a tuner to extract the data information from the inputted broadcast signal for information display.

20. The apparatus of claim 14, wherein the broadcast signal is a satellite broadcast signal.

21. The apparatus of claim 14, wherein the broadcast signal is an IPTV broadcast signal.

* * * * *